US005890110A

United States Patent [19]

Gersho et al.

[11] Patent Number: 5,890,110

[45] Date of Patent: Mar. 30, 1999

[54] VARIABLE DIMENSION VECTOR QUANTIZATION

[75] Inventors: Allen Gersho; Amitava Das; Ajit Venkat Rao, all of Goleta, Calif.

[73] Assignee: The Regents of the University of California, Oakland, Calif.

[21] Appl. No.: 411,436

[22] Filed: Mar. 27, 1995

[51] Int. Cl.$^{6}$ ................................ G10L 5/06; H04B 1/66

[52] U.S. Cl. ............................................ 704/222; 704/245

[58] Field of Search .................................... 395/2.31, 2.3, 395/2.39, 2.52, 2.53, 2.54, 2.5, 2.28, 2.38, 2.94, 2.95; 382/2.52, 225, 224, 251

[56] References Cited

U.S. PATENT DOCUMENTS

| | | | |
|---|---|---|---|
| 4,680,797 | 7/1987 | Benke | 395/2.2 |
| 4,712,242 | 12/1987 | Rajasekarak et al. | 395/2.62 |
| 5,138,662 | 8/1992 | Amano et al. | 395/2.28 |
| 5,173,941 | 12/1992 | Yip et al. | 395/2.26 |
| 5,195,137 | 3/1993 | Swaminathan | 395/2.31 |

OTHER PUBLICATIONS

A. Gersho and R. Gray, "Vector Quantization and Signal Compression", Kluwer Press, 1992, Table of Contents.

J–P. Adoul and M. Delprat, "Design Algorithm for Variable––Length Vector Quantizers", Proc. Allerton Conf. Circuits, Systems, Computers, pp. 1004–1011, Oct. 1986.

Proakis, et al. MacMillan, 1993, see Chapter 11 of Discrete Time Processing of Speech Signals, pp. 623–675.

Griffin and Lim in "Multiband Excitation Vocoder" in the IEEE trans. Acoust. Speech, Signal Processing, vol. 36, pp. 1223–1235, Aug., 1988.

McAulay and Quatieri in "Speech Analysis/Synthesis based on a Sinusoidal Representation", in IEEE Trans. Acoust. Speech, Signal Processing vol. 34, pp. 744–754, Aug. 1986.

Shohan, Y. "High Quality Speech Coding at 2.4 to 4 kbps", Proc. IEEE Intl. Conf. Acoust., Speech, Signal Processing, vol. 2, pp. 167–170, Apr. 1993.

Kleijn, "Continuous Representation in Linear Predictive Coding", Proc. IEEE Intl. Conf. Acoust., Speech Processing, pp. 201–204, May 1991.

Adoul et al. "High Quality Coding of Wideband Audio Signals Using Transform Coded Excitation (TCX)", Proc. IEEE Intl. Conf. Acoust. Speech Signal Processing, vol. 1, pp. 193–196, May 1994.

M.S. Brandstein, "A 1.5 Kbps Multi–Band Excitation Speech Coder", S.M. Thesis, EECS Department, MIT 1990, pp. 27–46 and 55–60.

Rowe, Cowley and Perkis, "A Multiband Excitation Linear Predictive Speech Coder", Proc. Eurospeech, 1991.

C. Garcia et al. "Analysis, Synthesis, and Quantization Procedures for a 2.5 Kbps Voice Coder Obtained by Combining LP and Harmonic Coding", Signal Processing VI: Theories and Applications, Elsevier, 1992.

Digital Voice Systems, "Inmarsat–M Voice Codec, Version 2", Inmarsat–M specification, Inmarsat, Feb. 1991, pp. 1–38.

Lupini and Cuperman V. in "Vector Quantization of Harmonic Magnitudes for Low Rate Speech Coders", Proc. IEEE Globecom Conf., pp. 858–862, Nov. 1994.

(List continued on next page.)

*Primary Examiner*—David R. Hudspeth
*Assistant Examiner*—Donald L. Storm
*Attorney, Agent, or Firm*—Fulbright & Jaworski

[57] ABSTRACT

A variable dimension vector quantization method that uses a single "universal" codebook. The method can be given the interpretation of sampling full-dimensioned codevectors in the universal codebook and generating subcodevectors of the same dimension as input data subvector, which dimension may vary in time. A subcodevector is selected from the codebook to have minimum distortion between it and the input data subvector. The subcodevector with minimum distortion corresponds to the representative, full-dimensioned codevector in the codebook. The codebook is designed by inverse sampling of training subvectors to obtain full-dimension vectors, then iteratively clustering the training set until a stable centroid vector is obtained.

9 Claims, 11 Drawing Sheets

VDVQ Encoding Rule for Speech Spectra

OTHER PUBLICATIONS

P.C. Meuse, “A 2400 bps Multi–Band Excitation Vocoder”, Proc. IEEE Int. Conf. Acoust., Speech, Signal Processing, pp. 9–12, Apr. 1990.

M. Nishiguchi, J. Matsumoto, R. Wakatsuki and S. Ono, “Vector Quantized MBE with Simplified V/UV Decision at 3.0 Kbps”, Proc. IEEE Intl. Conf. Acoust., Speech, Signal Processing, pp. 151–154, Apr. 1993.

Das, Rao and Gersho, “Variable Dimension Vector Quantization of Speech Spectra for Low Rate Vocoders”, Proc. IEEE Data Compression Conf., pp. 420–429, Apr. 1994.

Das and Gersho, “A Variable–Rate natural–Quality Parametric Speech Coder”, Proc. International Communication Conf., vol. 1, pp. 216–220, May 1994.

Das and Gersho, “Enhanced Multiband Excitation Coding of Speech at 2.4 kb/s with Phonetic Classification and Variable Dimension VQ”., Proc. Eusipco–94, pp. vol. 2, pp. 943–946, Sep. 1994.

Das and Gersho, “Variable Dimension Spectral Coding of Speech at 2400 bps and Below with Phonetic Classification”, Proc. Intl. Conf. Acoust. Speech, Signal Processing, May 1995.

Cuperman, Lupini and Bhattacharya, “Spectral Excitation Coding of Speech at 2.4 Kb/s”, Proc. of Intl. Conf. of Acoust. Speech and Signal Processing, Detroit, May 1995.

Das, Rao and Gersho, “Enhanced Multiband Excitation Coding of Speech at 2.4 Kb/s with Discrete All–Pole Modeling”, Proc. IEEE Globecom Conf., vol. 2, pp. 863–866, 1994.

Law and Chan, “A Novel Split Residual Vector Quantization Scheme for Low Bit Rate Speech Coding”, Proc. IEEE Int. Conf. Acoust., Speech, Signal Processing, vol. 1, pp. 493–496, 1994.

Chan, “Multi–Band Excitation Coding of Speech at 960 BPS Using Split Residual VQ and V/UV Decision Regeneration”, Proc. of ICSLP, 1994, Yokohama.

g(X) : Selects some components of X

Model for Generating a Variable Dimension Vector Generation

Dimension Conversion Error = $D(S,\bar{S})$

Quantization error, $E_{VQ} = D(Y,\bar{Y})$

Overall Error = Error due to $D(S,\bar{S})$ + Error Due to $E_{VQ}$

Vector Quantization Using Dimension Conversion (DCVQ)

System Overview of the MBE Algorithm

Typical Spectrum of Human Speech

Spectral shape modeled as:

$$\hat{S}\left(n\omega_0\right) = \frac{G}{\left|\sum_{k=0}^{p} a_k e^{-jn\omega_0 k}\right|^2}$$

Use the following Distortion Measure:

$$E_{LP}(S, \hat{S}) = \frac{1}{L}\sum_{n=1}^{L}\frac{S\left(n\omega_0\right)}{\hat{S}\left(n\omega_0\right)}$$

Method:

The LP Method

Dependence of Dimensionality on $F_o$

Selector function Q:

$$Q[k] = \begin{cases} 1 \text{ if } k = \left\lceil \dfrac{jKF_0}{\pi} \right\rceil & ; j \text{ any positive integer} \\ 0 \text{ other wise} \end{cases}$$

FIG. 7 A

Extended Vector X:

$$X[k] = \begin{cases} S[j] \text{ if } k = \left\lceil \dfrac{jKF_0}{\pi} \right\rceil & ; j \text{ any positive integer} \\ 0 \text{ other wise} \end{cases}$$

FIG. 7 B

Example:

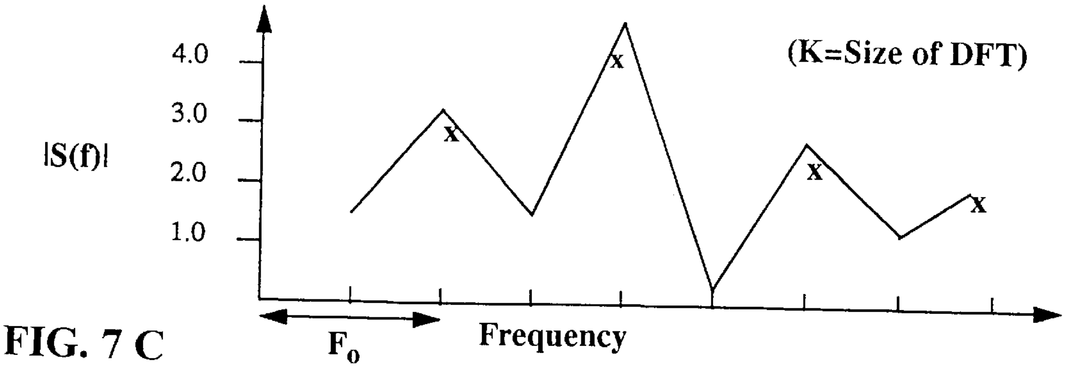

FIG. 7 C

$\underline{K}$ = = 8, $F_0$ = 2 units; if Q=(0, 1, 0, 1, 0, 1, 0, 1), $\bar{S}$ = Estimated SSV = (2.8, 4.1, 2.3, 1.7), L = 4

X=(0.0, 2.8, 0.0, 4.1, 0.0, 2.3, 0.0, 1.7 ) "Extended Vector"

FIG. 7 D

VDVQ Formulation

Select codevector $Y_{j*}$ such that $Y_{j*}$ sampled by $F_o$ is the closest match to the input SSV S VDVQ Encoding Rule for Speech Spectra Direct quantization delivers:

- Lower spectral distortion (SD)
- Higher speech quality

| | IMBE* | LP** | VDVQ** |
|---|---|---|---|
| Male | 3.00 | 2.75 | 1.45 |
| Female | 3.03 | 2.52 | 1.18 |
| Overall | 3.02 | 2.52 | 1.31 |

<u>SD for Different Quantization Methods</u>

* - 63 bits using inter-frame coding and spectral enhancements

**- 30 bits using no inter-frame coding and no enhancements

Comparison of Objective Performance of Various Methods

FIG. 9

A-B comparison Tests:

16 listeners; 64 sentence pairs; randomized order

EMBE (using 30 bits and VDVQ)

vs.

IMBE (using 63 bits and DCT-SQ)

Subjective Comparison of Coders

VARIABLE DIMENSION VECTOR QUANTIZATION

FIELD OF THE INVENTION

This invention pertains to a solution of the problem of efficient quantization as well as pattern classification of a variable dimensional random vector. A very useful application of this invention is the quantization of speech spectral magnitude vectors in harmonic and other frequency domain speech coders. It can also be applied to efficiently cluster and classify a variable dimensional spectral parameter space in a speech pattern classifier. The potential applications of this invention extend beyond speech processing to other areas of signal and data compression.

BACKGROUND OF THE INVENTION

Formulation

Vector Quantization (VQ) is a well known method to quantize a fixed dimensional random vector. (see A. Gersho and R. Gray, "Vector Quantization and Signal Compression", Kluwer Press, 1992). Vector Quantization is a block matching technique. Given an instance of the input random vector, a VQ encoder simply searches through a collection (a codebook) of predetermined vectors called codevectors that represents the random variable and selects one that best matches this instance. The selection is generally based on minimizing a predetermined measure of distortion between the instance and each codevector. The selected vector is referred to as the "quantized" representative of the input. The codebook may be designed off-line from a "training set" of vectors. The performance of a VQ scheme depends on how well the codebook represents the statistics of the source. This significantly depends on the training ratio or the ratio of the size of the training set to that of the codebook. Higher training ratios generally lead to better performance. Typically, VQ outperforms other methods including independent quantization of individual components of the random vector (scalar quantization). The improved performance of VQ may be attributed to its ability to exploit the redundancy between the components of the random vector.

In many signal compression applications, however, a signal evolving in time, may be well represented by a sequence of random vectors with a varying dimensionality L. Each such vector can often be modeled as consisting of a random subset of the components of an underlying, and possibly unobservable, A dimensional random vector, X. FIG. 1 illustrates a model of the generation of such a random vector, S, called a subvector, from the vector X by a sub-sampling operation. The random sub-sampler function, g(X) can be represented by a K dimensional random binary selector vector Q. The non-zero components of Q specify the components of X that are selected, i.e., sub-sampled. We assume that Q takes on one of N vector values. For example, if K=4, $X=(x_1,x_2,x_3,x_4)$ and Q=(0,1,0,1), then $S=g(X)=(x_2, x_4)$. Clearly, since Q is random, S is a variable dimensional quantity. Since the dimension of S, L, varies from one occurrence to another, conventional VQ is not useful since a fixed dimension codebook is not applicable here. Efficient quantization of the subvector S is a challenging problem. The problem is to find a digital code or binary word with a particular number of bits that can be generated by the encoder to represent any observed instance of S so that a suitably accurate reproduction of S can be regenerated by a decoder from observation of the digital code.

Previously Adoul and Delprat (J-P. Adoul and M. Delprat, "Design algorithm for variable-length vector quantizers," Proc. Allerton Conf. Circuits, Systems, Computers, pp. 1004–1011, October 1986.) have studied variable dimension VQ. However, in their formulation, a separate codebook is required for each possible dimension that the input vector might have. This method will require an extraordinarily large amount of memory to store a very large number of codebooks. Furthermore, the design of each of these codebooks requires an astronomic amount of training data that is entirely impractical for many applications. Our invention offers an entirely different solution that requires the storage of only a single codebook.

A related problem that is also solved by our invention is the digital compression of a large fixed dimension vector X of dimension K from observation of a L-dimension subvector S obtained from X by a sub-sampling operation with a variable selection of the number and location of indices identifying the components to be sampled.

Our formulation of variable dimensional vector quantization and the invention described herein to solve this problem has not been found in the prior art. However, the problem is relevant to some applications in speech coding and elsewhere and our invention results in considerable performance improvements in speech coding systems that we have tested.

An important extension of the VDVQ formulation is the design of a pattern classifier for variable dimensional vectors. No direct method can be found in prior art, some work has been done in speech recognition context using indirect methods such as Dynamic Time Warping (DTW) (see chapter 11 of "Discrete Time Processing of Speech Signals", by Proakis, et, al, MacMillan, 1993). Our invention offers a direct and efficient way to classify variable dimension feature vectors.

Speech Compression Context

A significant application of variable dimension vector quantization arises in harmonic and other spectral coding which is an important new direction in parametric coding of speech. Some of the harmonic coders that have been proposed are:

(1) Mulliband Excitation (MBE) coder (see Griffin and Lim in "Multiband excitation vocoder" in the IEEE trans. Acoust., Speech, signal Processing, vol. 36, pp. 1223–1235, August, 1988.)

(2) Sinusoidal Transform coder (STC) (see McAulay and Quatieri in "Speech analysis/synthesis based on a sinusoidal representation", in IEEE Trans. Acoust. Speech, signal Processing, vol. 34, pp. 744–754, August 1986).

In the MBE coder (FIG. 3), the short term spectrum of each 20 ms segment or "frame" of speech is modeled by 3 parameters (see FIG. 4 and its description): the fundamental frequency or pitch $F_o$, a frequency-domain voiced/unvoiced decision vector (V), and a vector composed of samples of the short-term spectrum of the speech at frequencies corresponding to integral multiples of the pitch, $F_o$. This vector of spectral magnitudes which is representative of the short-term spectral shape is referred to henceforth as the Spectral Shape Vector (SSV) and corresponds to what we generically call a "subvector". Since $F_o$ depends largely on the characteristics of the speaker and the spoken phoneme, the SSV can be treated as the variable dimension vector modeled in the above Formulation section. The underlying K dimensional random vector is the shape of the short-term spectrum of speech.

The quantization of the parameters of a harmonic coder is an important problem in low bit-rate speech coding, since the perceptual quality of the coded speech almost entirely depends on the performance of the quantizers. At low bit rates (around 2400 bit per second or below), few bits are available for spectral quantization. The SSV quantizer must therefore exploit as much of the correlation as is possible, while maintaining manageable complexity. Other low bit rate speech coding algorithm such as the Time-Frequency Interpolation (TFI) coder (see Shoham, Y. "High Quality Speech Coding at 2.4 to 4 kbps", Proc. IEEE Intl. Conf. Acoust., Speech, Signal Processing, vol 2, pp. 167–170, April 1993), the Prototype Waveform Interpolation (PWI) coder (see Kleijn "Continuous Representation in Linear Predictive Coding", Proc. IEEE Intl. Conf. Acoust., Speech, Signal Processsing, pp. 201–204, May 1991) and wideband audio coding algorithms, such as Transform Coding Excitation (TCX) (see Adoul, et al, "High Quality Coding of Wideband Audio Signals Using Transform Coded Excitation (TCX)", Proc. IEEE Intl. Conf. Acoust. Speech Signal Processing, vol 1, pp. 193–196, May 1994) also require an effective solution to the quantization of variable dimension spectral magnitude vectors. The STC coder (both the harmonic and non-harmonic versions) needs to encode variable dimension spectral amplitude vectors which can be easily modeled as the variable dimension vector referred to above in the Formulation section.

The development of an efficient compression scheme for variable dimension vectors would therefore contribute significantly to improvement of the performance of the speech coders described in this section.

Speech Recognition Context

The broad problem of speech recognition is to analyze short segments of speech and identify the phonemes uttered by the speaker in the time interval corresponding to that segment. This is a complex problem and several approaches have been suggested to solve it. Many of these approaches are based on the extraction of a few "features" from the speech signals. The features are then recognized as belonging to a "class" by a trained classifier. However, in the context of the harmonic model of speech proposed recently, we believe that an appropriate choice of features is the parameter set of the MBE or the STC coder. The input speech signal may be time-warped dynamically to normalize the speed of the utterance. The time-warped signal may be input to an MBE or an STC coder to generate a set of parameters which capture the essential phonetic character of the input signal. The phonetic information about this signal, esp. the identity of the phoneme uttered is contained in the variable dimensional spectral shape vector(SSV). The variable dimensional nature of this vector complicates the classification problem. One traditional approach to classification in a fixed dimensional space is to use a "prototype-based classifier". Prototypes are vectors associated with a class label. A prototype-based classifier contains a codebook of prototypes and associated class labels. Typically, more than one prototype may be associated with the same class label. Given an input fixed-dimensional feature, we compute the closest prototype from the "codebook" of prototypes and assign to the input, the class label associated with this prototype. This approach has been used widely in the prior art for many applications. However, no work has been done in the direction of extending this structure to the problem of classification of variable dimensional features.

Prior Art

Several methods in the prior art exist to attack the important problem of variable dimension vector quantization.

The Scalar Quantization approach is to simply design individual scalar quantizers for each component in S, using as many such quantizers as needed for the particular input subvector to be quantized. While this approach is very simple in design and implementation, it does not exploit the statistical correlation between vector components and performs very poorly at low bit rates.

A second method is to use an independent fixed dimensional vector quantizer codebook for S for each of the N possible values of the dimension Q. (See again the paper by Adoul and Delprat mentioned above.) We refer to this approach as the Multi-codebook Variable Dimension Vector Quantization (MC-VDVQ). While MC-VDVQ is in principle effective, it involves considerable training complexity and significant memory requirements at the encoder. In a typical example in speech coding, if N=200 and we are allowed 30 bits ($2^{30}$ vectors) to represent the source, the MC-VDVQ encoder has to store 200,000,000,000 vectors. Further, assuming a typical training ratio of 100, we would need 20,000,000,000,000 training vectors to design good codebooks. Since training on such a large scale is impossible and memory is precious in a number of consumer electronics, mobile and hand-held device applications, MC-VDVQ is grossly impractical.

In the context of speech, some approaches have been suggested. The most common one is Dimension Conversion Vector Quantization (DCVQ). Here, the variable dimension vector S with dimension denoted by L is transformed to a fixed (P) dimensional vector Y, using some model. Y is then quantized to $\hat{Y}$ using a fixed-dimensional quantization scheme. (See FIG. 2.) The decoder must reconstruct an L-dimensional estimate of S, $\hat{S}$ from $\hat{Y}$. Note that there are two contributions to the overall error: the modeling error and the quantization error. The performance depends heavily on the choice of the model used. In speech, a common model is the all-pole model. We describe the corresponding quantization algorithm as the LP method (see FIG. 5). The approach has been studied extensively in: M. S. Brandstein, "A 1.5 Kbps multi-band excitation speech coder", S.M. Thesis, EECS Department, MIT, 1990; pp. 27–46 and 55–60; Rowe, Cowley, Perkis, "A multiband excitation linear predictive speech coder", Proc. Eurospeech, 1991, R. J. McAulay, T. F. Quatieri, 1986 supra and C. Garcia, et al, "analysis, synthesis, and quantization procedures for a 2.5 kbps voice coder obtained by combining LP and harmonic coding", signal Processing VI: Theories and Applications, Elsevier, 1992. However these methods clearly pay the extra penalty of modeling error, which often is quite significant. In low bit-rate speech coding applications, such additional modeling errors lead to severe degradation of the perceptual quality of the coded speech. The overall distortion is also significantly high.

Another speech spectral coding application, the INMARSAT standard IMBE coder, (see Digital Voice Systems, "Inmarsat-M Voice Codec, Version 2", Inmarsat-M specification, Inmarsat, February 1991.) uses the Discrete Cosine Transform (DCT) for data compaction and an independent scalar quantization scheme to quantize each DCT coefficients. This requires a large number of bits and leads to a complex scheme. Further, it does not offer the efficiency advantage of vector quantization over scalar quantization. A related method has been proposed recently by Lupini, Cuperman V. in "Vector Quantization of Harmonic Magnitudes for Low Rate Speech Coders", Proc IEEE Globecom conf,. pp. 858–862, November 1994). They suggest dimension conversion to a fixed dimensional vector using a non-square transform technique followed by a vector quantization of the transformed vector. Other dimension conversion approaches, such as the work by Meuse (see P. C. Meuse, "A 2400 bps Multi-Band Excitation Vocoder", Proc. IEEE Int. Conf. Acoust., Speech, Signal Processing, pp. 9–12, April 1990.) and the work by Nishiguchi (see M. Nishiguchi, J. Matsumoto, R. Wakatsuki, and S. Ono, "Vector quantized MBE with simplified V/UV decision at 3.0 kbps", Proc. IEEE Int. Conf. Acoust., Speech, Signal Processing, pp. 151–154, April 1993.), propose DCVQ using sample rate conversion and follow that by a vector quantization of the fixed dimension vector. All the dimension-conversion methods suggested above suffer from the problem of modeling and/or dimension conversion errors.

The method proposed in our invention, offers superior performance (as indicated in FIG. 9) compared to the prior art, while not requiring any dimension conversion or implicit assumptions about models for the data.

Objects and Advantages

An object of the invention is to provide an efficient solution to the problem of quantizing variable dimension vectors. The solution uses only one codebook with a very modest memory and complexity requirement compared to the multi-codebook MC-VDVQ approach. Our method does not incur the extra penalty due to dimension conversion or modeling used in prior dimension conversion vector quantization (DCVQ) approaches and delivers significantly better performance.

Another object is, given a distortion measure, the derivation of encoding and decoding rules for implementing the proposed VDVQ method.

Another object is the derivation of an algorithm to train the universal codebook of the VDVQ.

Another object is the application of the method to parametric speech spectral coding and demonstration of the power and advantages of our method.

Another object is the specific interpretation of the relationship of harmonic amplitudes and speech spectral envelope in deriving the universal codebook for variable dimension speech spectral shape vector coding.

Another object is the application of the proposed VDVQ clustering to design an efficient pattern classifiers for variable dimension "feature vectors".

Another object is the application of the invention to speech recognition and to other areas of compression.

SUMMARY OF THE INVENTION

We propose an efficient direct quantization method to encode the variable dimension vector. We refer to this method as Variable Dimension Vector Quantization (VDVQ). The objective is achieved by designing a codebook for the underlying random vector, X. We derive simple encoding and decoding rules for VDVQ. Further, we derive a simple iterative algorithm to design a good codebook for X, using a training set of X vectors. As an example, the superiority of our technique over other competing approaches is demonstrated for an important problem in speech coding.

The formulation of our VDVQ invention can be extended to design an efficient pattern classifier for unsupervised or suvervised clustering/labeling of variable dimension feature vectors. Applications of such a pattern classifier, such as automatic speech recognition (ASR), is suggested.

BRIEF DESCRIPTION OF THE DRAWINGS

FIG. 7 depicts a small example of the sampling formulation in which the relevant quantities have been evaluated.

FIG. 9 shows the performance gain of the proposed method in terms of the ratio of spectral distortion (SD) to the number of bits compared with two prior coders.

DESCRIPTION OF THE PREFERRED EMBODIMENTS OF THE INVENTION

Figure 1:
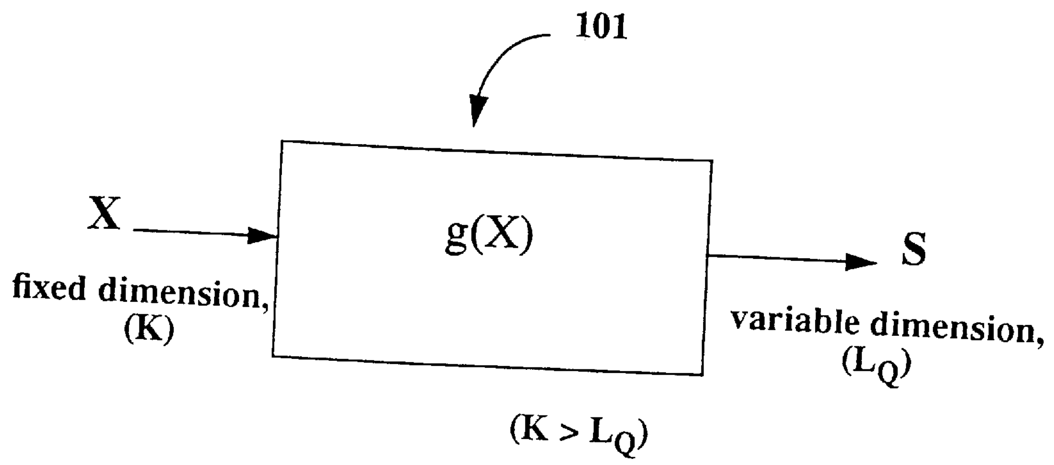
FIG. 1 is a schematic diagram which shows our model for generating a variable dimension vector, from an underlying fixed dimensional vector.
Figure 2:
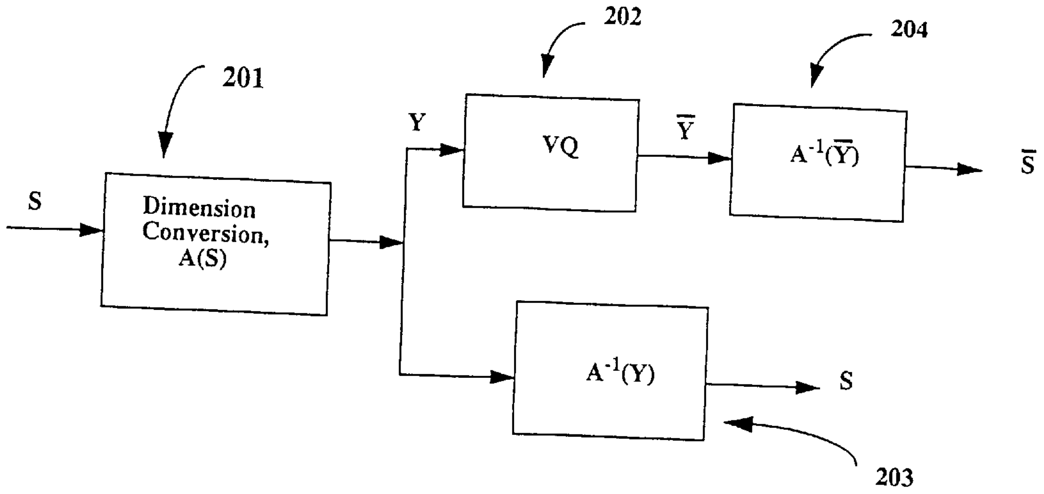
FIG. 2 is a schematic diagram showing the dimension conversion Vector quantization (DCVQ) approach to the problem of quantizing variable dimensional subvectors.

A model for generating a variable dimension vector, called a subvector, from an underlying fixed dimensional vector is shown in FIG. 1. Block 101 in the figure implements g(X), the sub-sampling function. Effectively, this block sub-samples the input "underlying" vector to give the (observable) output vector, S, which in FIG. 2 is an input variable dimension vector. Block 201 converts the input variable dimension vector, S to a fixed dimension vector, Y using some dimension conversion technique. Typically it is a non-square linear transformation. In the speech context, it has very often been implemented by an LP model. Y is typically compressed by some VQ scheme (block 202). The decoder block 204, represented by $A^{-1}(Y)$ does an inverse mapping from the quantized fixed-dimensional vector to the estimate to the variable dimensional vector, $\hat{S}$. Note that the dimension conversion is not necessarily an invertible operation. The block, 203 represents the decoding of the unquantized vector, Y. Its operation is similar to that of block 204. It is used in this diagram to simply help to compute the cost of the dimension conversion. The entire operation involves two kinds of errors, the modeling error given by the error independent of quantization, i.e. $D(S,\hat{S})$ and the error due to quantization i.e. $D(Y,\hat{Y})$.

Figure 3:
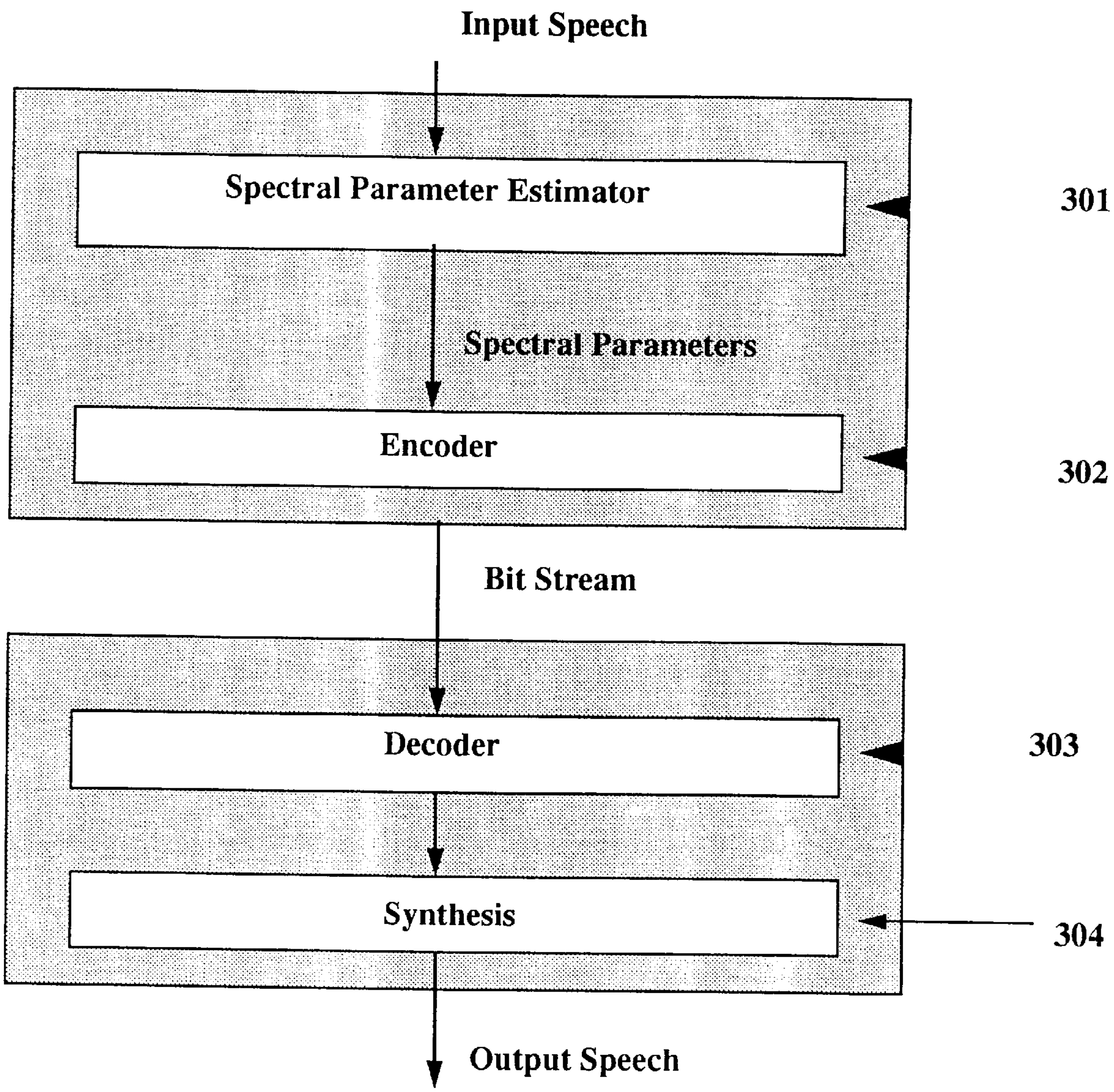
FIG. 3 is a schematic diagram showing the system overview of the Multiband Excitation (MBE) algorithm.
Figure 4:
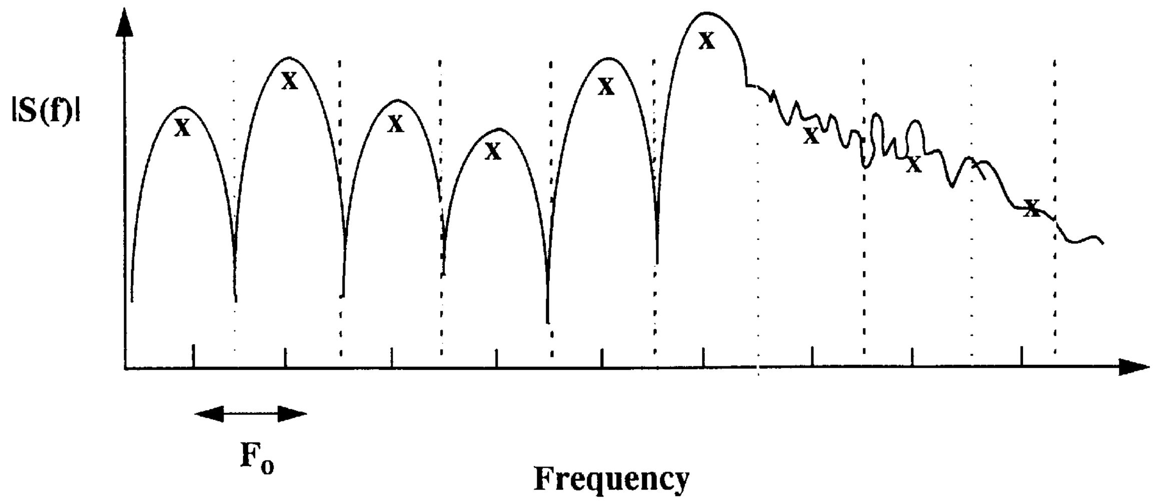
FIG. 4 shows a typical human (short term) speech spectrum and the various MBE parameters used to model the spectrum.
Figure 5:
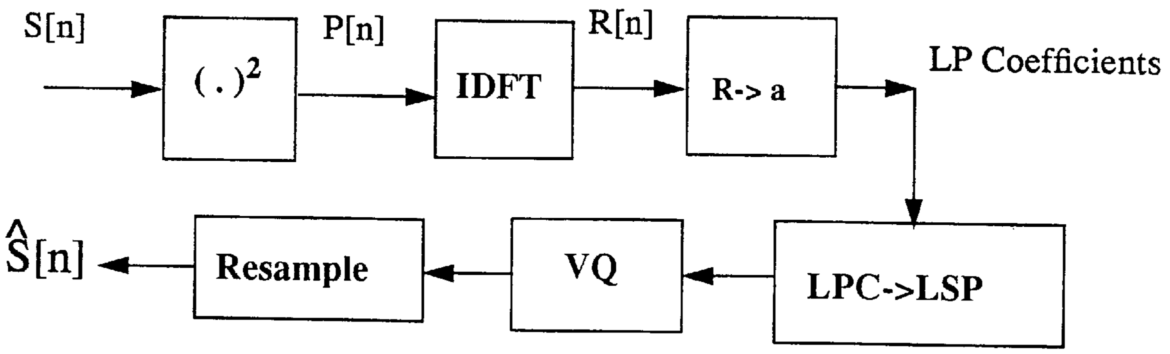
FIG. 5 shows the implementation block diagram and equation of the LP modeling approach and has been referred to in the Prior Art section.

Referring to FIG. 3, blocks 301 and 302 are present at the encoding stage. Blocks 303 and 304 represent the inverse operation being carried out at the decoder. Block 301 represents the conversion of the frame of speech to a collection of (variable dimensional) parameters which represent that frame of speech. Block 202 quantizes these parameters using some scheme. Block 303 does the inverse quantization and block 304 converts the decoded parameters back to speech using the MBE model. We have used this framework to compare the proposed VDVQ method to prior methods to quantize variable dimension vectors. Referring to FIG. 4, the "X" denotes amplitude estimates taken at the harmonics of the pitch $F_o$, and jointly they form the variable dimensional spectral shape vector or SSV. FIG. 5 shows the implementation block diagram and equation of the LP modeling approach.

Figure 8:
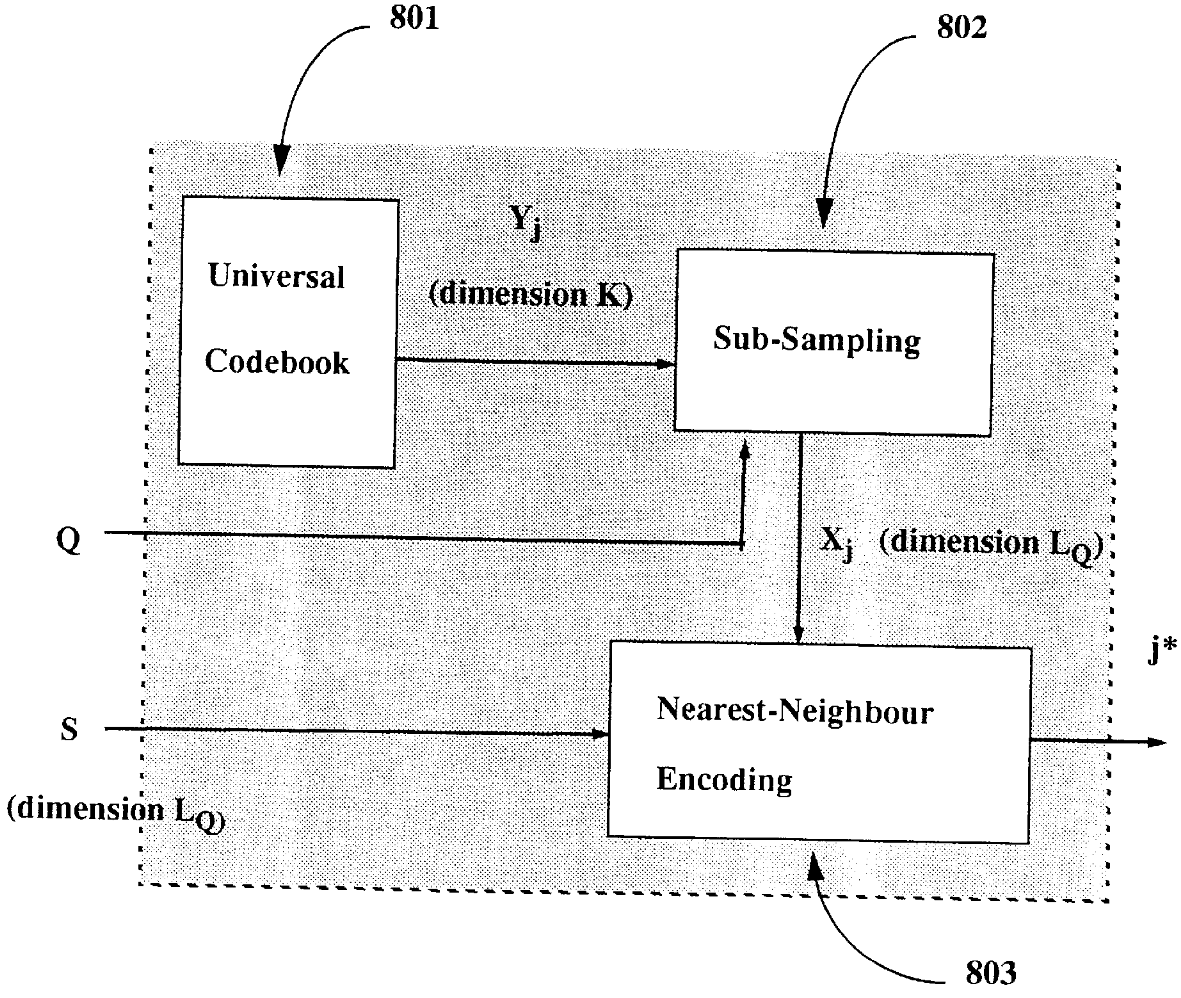
FIG. 8 shows the encoding rule for VDVQ with relevance to compression of speech spectra.

Referring to FIG. 8, the encoding rule can be as follows: given the interpretation of sampling the universal codebook for components we are interested in and generating a new codebook in the $L_Q$ dimensional space. Block 801 represents a universal codebook (with dimension K). Given Q, block 802 sub-samples each codevector in the universal codebook at components corresponding to the non-zero values of Q to give a new $L_Q$ dimensional codebook. The best codevector in this new codebook which matches the input vector, S is selected as the representative by the nearest neighbor block, 803.

VDVQ Formulation

We first describe a few quantities relevant to the description which follows and relate the quantities in the general formulation to those in the speech coding context.

The VDVQ receives as input, the pair {Q,S}, where Q is the "selector vector" and S is the corresponding variable dimension subvector. As mentioned earlier, S is assumed to have been sampled from some larger dimension random variable X, using the selector vector, Q. We define the extended vector, Z, which is K dimensional. Z is formed by using Q to map the components of S to their correct locations in the underlying vector's space (K dimensional). All the missing components of Z are assigned a value of 0. For example if Q=(0,1,0,1) and S=(q,r), then Z=(0,q,0,r). Note that the means of "selection" of the variable dimensional "subvector" S from the larger dimension vector X as well as the corresponding "extension" of S to Z can also be done by other equivalent methods, such as using an ordered set of indices of the samples to be selected, instead of using a "selector vector". In other words, in the example given, the "selection" can be specified by using the ordered set (2,4) instead of using Q as shown. For the sake of simplicity and ease of understanding we will represent the variable dimension subvector and the underlying "selection" or "sampling" process by the pair (S, Q) in the rest of the document.

In the harmonic speech model, the "selection" process is controlled by the estimated pitch value $F_o$. The DFT resolution used to compute the short term spectrum determines the larger dimension K, whereas the dimension L of the variable dimension subvector S and the selector vector Q is completely specified by the estimated pitch $F_o$. Assuming a normalized scale for the frequency (i.e., the sampling frequency of the A/D converter=2π), the kth component of the selector vector Q corresponds to the frequency k·π/K. Thus, the pitch frequency determines the set of samples of the underlying fixed dimension vector from which the subvector S is formed. Given the input pair $F_o$,S, the corresponding Q is generated according to:

$$Q[k] = \begin{cases} 1 & \text{if } k = \lceil jKF_o/\pi \rceil \\ 0 & \text{otherwise} \end{cases}$$

Q thus specifies the components of some underlying "extended spectral vector" that were sub-sampled to obtain this SSV. Similarly, the SSV can be converted into an extended spectral vector as follows:

$$Z[k] = \begin{cases} S[j] & \text{if } k = \lceil jKF_o/\pi \rceil \\ 0 & \text{otherwise} \end{cases}$$

for 1≦k≦K.

FIG. 7 illustrates this rule with a simple example. To complete the formulation, we define the distortion measure between an input SSV S with its associated selector vector Q and a spectral shape code vector $Y_j$ in the universal codebook. This measure is based on matching the input SSV samples to the corresponding subset of components of the spectral shape code vector $Y_j$. Thus, $$d(Z, Y_j) = \frac{1}{L_Q} \sum_{k=1}^{K} Q[k] d_1(Z[k], Y_j[k]) \quad (1)$$

where $L_Q$ denotes the number of nonzero components of Q and $d_1$(s,y) is a specified distortion measure between two scalars s and y. Note that, the selector vector Q[k] has exactly $L_Q$ 1's and (K–$L_Q$) 0's. The role of Q is to select the proper $L_Q$ components of $Y_j$s for comparison with S. Given these equations, we may assume that every input pair, ($F_o$,S), in the speech coding context, are replaced by the pair (Q,S).

Encoding Algorithm

Assume that a universal codebook is given for the underlying random vector, X. This codebook consists of N codevectors $Y_j$ of dimension K. Given the input pair (Q, S), the optimal VDVQ converts the $L_Q$-dimension S to an extended K-dimension Z as described earlier. Next it searches through the codevectors $Y_1$ to $Y_N$ in the universal codebook to find the index j* for which d(X,$Y_j$) is minimum over all j=1,2, . . . , N. (An arbitrary tiebreaker rule can be used.) The spectral shape is thus quantized with $\log_2 N$ bits to specify the index. The encoder 302 in relation to the entire coding system for speech is shown in FIG. 8. Equivalently, the encoder operation can be performed by constructing a new "codebook" by sub-sampling the universal codebook using Q to form a new set of codevectors called subcodevectors, having the same dimensionality $L_Q$ as the input variable dimension vector. Then, the encoder selects the subcodevector from this new codebook that best matches the input subvector.

Decoding Algorithm

The decoder receives the selector vector Q and the optimal index j* and it has a copy of the universal codebook. It extracts the optimal codevector $Y_{j^*}$ from the universal codebook. Further, it computes an $L_Q$ dimensional variable dimensional vector, $\hat{S}$ as the estimate of the original vector S by sub-sampling $Y_{j^*}$. Specifically, it picks the components of $Y_{j^*}$ for which the corresponding components of Q are nonzero, proceeding in order of increasing component index and concatenates these samples to form $\hat{S}$. Thus, the index j* can be viewed as a compressed digital code which, in conjunction with the selector vector, allows a reproduction of both $Y_{j^*}$, the fixed K dimensional vector as well as of the subvector S.

Codebook Training Algorithm

Given a training set and an initial codebook of size N and dimension K, the codebook is iteratively designed in a manner similar to the usual generalized Lloyd algorithm (GLA) as described in the book by Gersho and Gray, cited earlier. Each training iteration has the following two key steps:

1) Clustering of training vectors around the codevectors using a nearest neighbor rule, and
2) Replacing the old codevectors by the centroid of such clusters (Centroid Rule).

At the end of training, the codevectors will be given by the centroids of the final clusters. The training set consists of a large set of pairs {($Q_i$,$S_i$)}, where $Q_i$ is the selector vector and $S_i$ is the corresponding variable dimension vector. Denote the codevectors of the codebook prior to the current iteration as $Y_j$, j=1,2, . . . ,N. The two key steps of each training iteration are:

NEAREST NEIGHBOR RULE (a) Use the equations in the VDVQ Formulation section to compute the extended vector, $Z_i$ for each training pair $(Q_i,S_i)$. Assign $Z_i$ to cluster $C_m$ if $d(Z_i,Y_m)\leqq d(Z_{i,Yj})$ for j=1,2, . . . ,N, with a suitable tie-breaking rule.

CENTROID RULE (b) For each cluster, $C_m$, m=1,2, . . . ,N, find a new code vector $Y_m'$ such that over all vectors y it minimizes the cluster distortion given by $$D_m = \sum_{j\epsilon C_m} d_1(Z_j, y).$$

For the mean squared error distortion, where $d_1(s,y)=\|s-y\|^2$, the centroid rule gives $$Y_m[k] = \frac{\sum_{j\epsilon C_m} \frac{1}{L} Q_j[k]Z_j[k]}{\sum_{j\epsilon C_m} \frac{1}{L} Q_j[k]} \text{ for } k = 1, 2, \ldots, K \quad (2)$$

The updated codebook is tested for convergence, and if convergence has not been achieved, the process of clustering, computing centroids, and testing for convergence is repeated until convergence has been achieved.

VDVQ Application to Speech Spectral Quantization

We have successfully applied our VDVQ method, its formulation, encoding/decoding algorithms and training algorithm to low bit rate speech coding. The improvements over conventional methods were significant. (See Das, Rao, Gersho, "Variable Dimension Vector Quantization of Speech Spectra for Low Rate Vocoders", Proc. IEEE Data Compression Conf., pp. 420–429, April 1994; Das, Gersho, "A variable-rate natural-quality parametric speech coder", Proc. International Communication Conf, vol 1. pp. 216–220, May 1994; Das, Gersho, "Enhanced Multiband Excitation Coding of speech at 2.4 kb/s with Phonetic Classification and Variable Dimension VQ", Proc Eusipco-94, pp vol. 2, pp 943–946, September 1994; Das, Gersho,"Variable Dimension Spectral Coding of Speech at 2400 bps and below with Phonetic Classification", Proc. Intl Conf. Acoust. Speech Signal Processing, To appear, May 1995.)

Figure 6A:
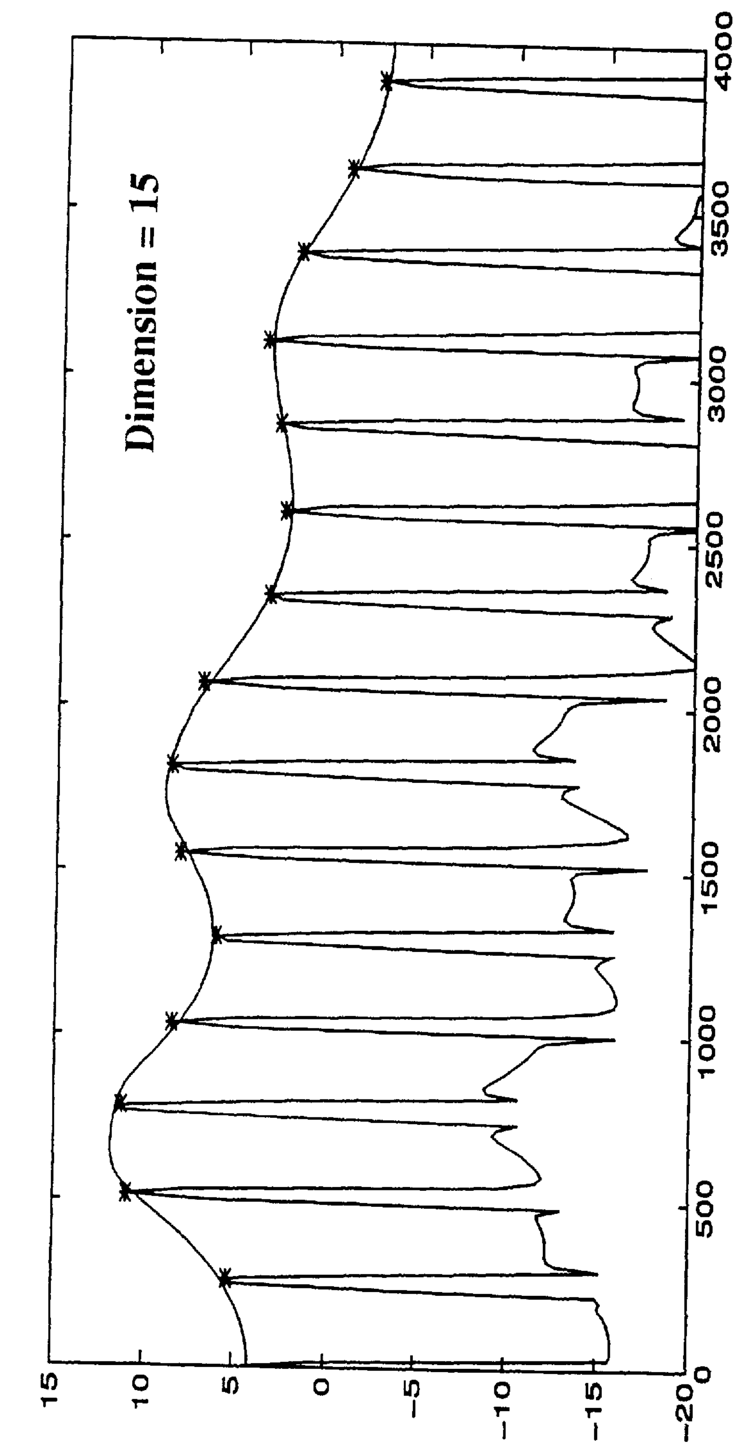
FIG. 6 shows the dependence of the dimensionality of the SSV on the value of the pitch.
Figure 6B:
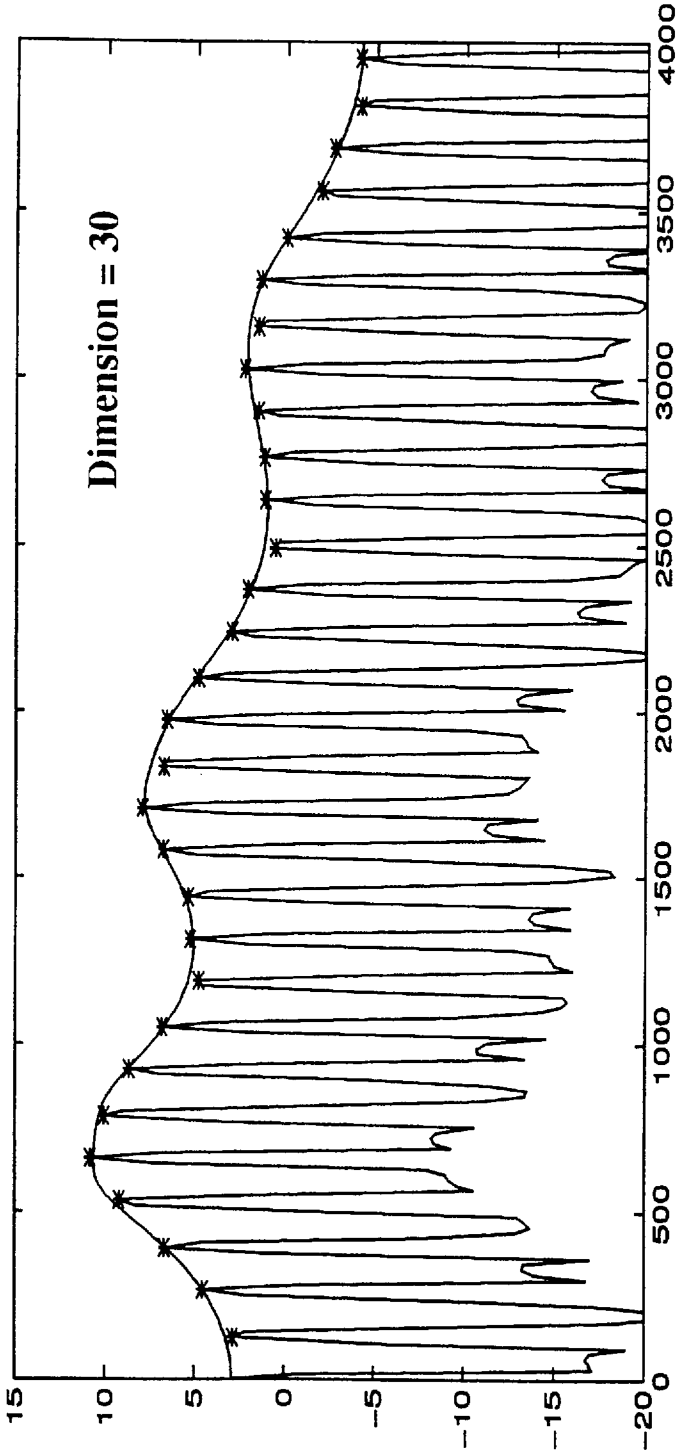

Also, in the context of harmonic coding of speech, the universal codebook that was designed as a part of the VDVQ can be given a novel interpretation. In harmonic coders like MBE and STC, as in other speech coders like PWI, TFI and TCX, the variable dimension vector that we are interested in quantizing is actually formed by sampling an underlying "spectral shape" (as observed in the short term spectral magnitude) at certain frequencies. Hence, the formulation of VDVQ as a sub-sampled source vector is justified. In fact, the universal codebook is a rich collection of possible spectral shapes. In other words, the fixed dimension underlying source is the short-term spectrum of the speech signal at the full resolution of the discrete Fourier transform used to obtain this spectrum. This spectrum is determined by the shape of the vocal tract of the speaker during the utterance. The sampling of this underlying shape is dictated by the pitch of the utterance which is determined by the glottal excitation. We assume that the spectral shape and the pitch are statistically independent (a reasonable assumption justified by the physiology of human speech production). Thus, any particular phoneme will exhibit roughly the same spectral shape independent of the speaker's pitch. The characteristic value of the pitch varies from person to person. Children's voice tends to have a higher pitch than that of female voice. Male speech usually has a lower pitch than that of female speech. Thus the same utterance by two different people would have similar "shape" but the number of samples (dimension of the variable dimension vector) would vary greatly. See FIG. 6 where (a) represents the spectrum for a female speaker and (b) represents the spectrum of a similar phoneme for a male speaker. In fact, female speech will generate a lower dimension SSV, while male speech (for the same phoneme) will generate a higher dimension SSV. The rough shape of the spectra in the two figures are similar, but the sampling (which depends on $F_o$) might result in grossly different dimensional vectors which are statistically similar to each other. During the quantization, our VDVQ method understands this similarity and ensures that this information is exploited, to same bits since both these vectors would be assigned to the same codevector of the universal codebook, although they are typically grossly different in dimensionality. The VDVQ codebook thus captures the phonetic character of the training set.

Performance and Cost Advantage

Figure 10A:
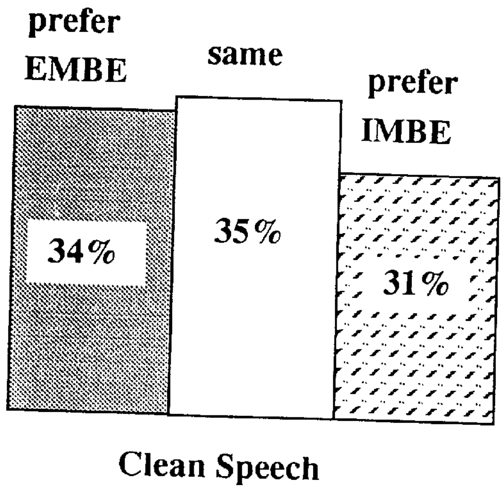
FIG. 10 shows the comparative subjective quality of the different methods for different schemes for quantizing the variable dimension SSV and in which the VDVQ coder clearly performed much better than the competitor.
Figure 10B:
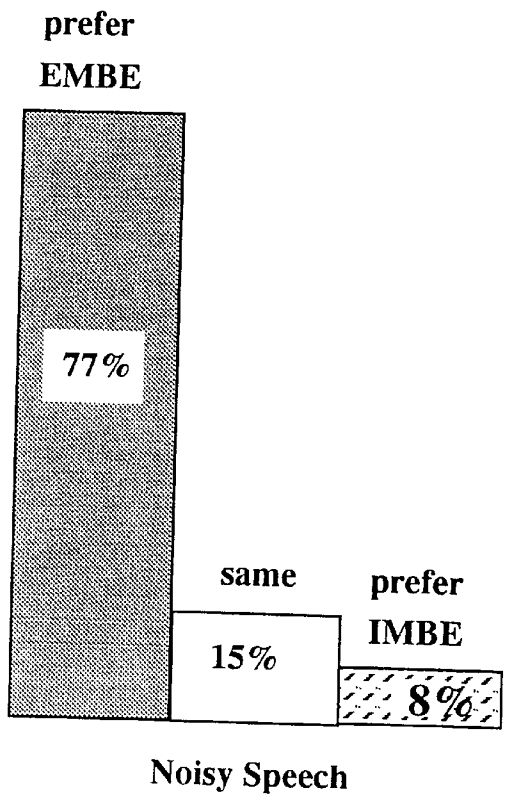

Our VDVQ method uses much less codebook memory and training complexity (compared to the multi-codebook approach). For the illustrative example mentioned in the Prior Art section, our approach needed only 80,000 vectors for training, as opposed to 20,000,000,000,000, needed for MC-VDVQ. As far as performance is concerned, FIG. 10 shows that in the speech coding application, VDVQ outperforms the LP method (FIG. 9) which is a prior work using the dimension conversion VQ approach discussed in the Prior Art section. The performance measure used is the standard spectral distortion measure between the original spectral vector, S and the estimate $\hat{S}$.

$$SD(S, \hat{S}) = \sqrt{\frac{100}{L_Q - 1} \sum_{k=1}^{L_Q-1} (\log_{10}S[k] - \log_{10}\hat{S}[k])^2} \quad (3)$$

Our VDVQ method also deliver performance similar to IMBE which also uses an indirect method (see Digital Voice Systems, supra to encode the variable dimension spectral magnitude vectors. However, the IMBE method needs 63 bits to achieve an average SD of 1 dB, while VDVQ uses only 30 bits to deliver 1.3 dB SD. Also note that the IMBE method uses interframe coding (using a delay and an additional frame of data), while our implementation of VDVQ operates only within a frame. When speech compressed by different methods was compared by human listeners, the subjective quality results indicated that the proposed method (VDVQ) based speech coder gave equivalent/better performance than prior IMBE quantization methods. (See FIG. 10.)

VDVQ Structures Using Different Forms of Structured VQ

VDVQ can be "customized" to the need of a particular encoding application in terms of codebook memory, encoding complexity, and performance. This can be done by integrating it with various structured vector quantization techniques like Tree Structured VQ (TSVQ), MultiStage VQ (MSVQ), Shape-Gain VQ (SGVQ)and Split VQ (see A. Gersho and R. Gray, 1991, supra). In fact, in our implementation, (Das, Rao, Gersho, 1994, supra), we use a combination of shape-gain VQ and split VQ. In these cases, the encoding, decoding, training rules described in the VDVQ Formulation section and in the Codebook Training Algorithm section can be easily applied with a negligible modification. This makes it easy to integrate our VDVQ method with other structured VQ techniques (not limited to the ones mentioned here).

VDVQ Application to Speech Recognition

As mentioned earlier, the VDVQ design algorithm holds considerable promise for the problem of recognition and classification of features in speech. A large amount of phoenetic information is contained in the variable-dimensional Spectral Shape Vector (SSV). However, design of prototype-based classifiers to classify this variable-dimensional featiure is a problem that has not been addressed in the prior art. Our approach is to design a universal codebook of prototypes and associated class labels. More than one prototype may be associated with the same class label. Given an input variable dimensional vector and the associated selector vector, we simply sub-sample each prototype in this universal codebook at components corresponding to the non-zero values of the input selector function. This generates a new codebook whose codevectors have the same dimension as the input. Next, we simply determine the codevector in this new codebook that is closest to the input (based on some distance measure). Finally, we associate the input with the class label of the universal prototype that the closest codevector was sub-sampled from.

Design of such a prototype-based classifier is easily derived from the design approach suggested above for quantization. Given a training set of variable dimensional vectors, associated selector vectors and associated class labels, we simply ignore the class labels and use the training set of variable dimensional vectors and associated selector vectors to design a universal VDVQ codebook as described in the section above. After convergence of the training algorithm, we assign to each member of the training set, the universal codevector that it is nearest to. Next, we associate each codevector in the universal codebook with the class label that is most often associated with members of the training set that were assigned to it.

We believe that this approach has not been tried out in the prior art and that it holds considerable promise in this field.

Conclusion, Ramifications, and Scope of Invention

Our invention, Variable Dimension Vector Quantization, or VDVQ, offers a simple, elegant and efficient solution to the problem of clustering and encoding variable dimension vectors and has the following features:

1. It delivers high performance at modest complexity and using much smaller codebook memory and training set complexity compared to multi-codebook approach (MC-VDVQ). It can be easily integrated with other structured VQ approaches to customize the encodingdecoding to the need of the application in terms of complexity, memory, performance targets.

2. It offers a direct vector quantization technique without incurring the cost any dimension conversion or modeling errors which prior methods incur.

3. We offered a special interpretation of the harmonic speech spectral data encoding using our VDVQ formulation. Application of VDVQ to speech spectral coding demonstrated significant advantage of this method with respect to prior indirect approaches. The method gains significantly in both an objective and a subjective sense over the prior art.

4. Our proposed invention can be applied to speech recognition by using the variable dimensional Spectral Shape Vector as a phoentic feature and extending prototype-based classification of fixed-dimension features to the case of variable dimension features.

Although we have used speech spectral coding to demonstrate the power of of our invention, it is to be understood, however, that various changes and modifications may be made by those skilled in the art without changing the scope or spirit of the invention. For example, the variable dimension subvector may represent a sub-sampled set of pixel amplitudes of a larger dimension vector that characterizes a block of pixels of an image. The suggested codebook design procedure can be based on any of several alternative VQ design methods reported in the literature.

We claim:

1. A method for digital signal compression for use with means for acquiring an input subvector which from time to time may have any one of a plurality of different dimensions with any particular occurrence of said subvector containing L sub-samples of a K-dimensional data vector with $L<K$, and means for producing an ordered set of L index values that identifies which ordered subset of components of said data vector yields the elements of said subvector, said method digitally compressing the subvector and comprising the steps of:

receiving a signal and computing a K-dimensional data vector representing the signal;

from a predetermined codebook containing a plurality of codevectors of fixed dimension K, extracting from each of said codevectors a subiodevector of dimension L by selecting components of said codevector in accordance with said ordered set of index values;

computing for each said subcodevector in said codebook a measure of distortion between said input subvector and said subcodevector; and comparing the distortion values so computed to find the substantially minimum distortion value and the corresponding optimal subcodevector that yields the substantially minimum distortion.

2. The method of claim 1 wherein the codebook contains N codevectors denoted $Y_i$, where the subscript i is an index for each stored codevector, and wherein said codebook is designed by the method of using an arbitrary initial codebook and a set of m pairs of training vectors, where $m>N$, with each such pair consisting of a selector vector Q that specifies said ordered index set and an associated variable dimension subvector S, comprising the steps of:

clustering said m pairs into N clusters wherein each individual pair is assigned to a particular cluster $C_i$ labeled with index i if the distortion between each variable dimension subvector S, of said individual pair and a subcodevector selected from each codevector $Y_i$ is minimized over all possible assignments of said individual pair to a cluster;

computing N centroid vectors from said N clusters of pairs wherein the centroid vector $G_i$ for cluster $C_i$ is chosen to be that vector which substantially minimizes the sum of the distortions between each pair (S, Q) in the cluster $C_i$ and the corresponding codevector $Y_i$;

updating said codebook by replacing each codevector $Y_i$ by the corresponding centroid vector $G_i$; and testing for convergence of the updated codebook, and if convergence has not been achieved, repeating the process of clustering, computing centroids, and testing for convergence, until convergence has been achieved.

3. The method of claim 1 wherein said data vector consists of samples representative of the spectral magnitude of a frame of speech, and said ordered set of index values is responsive to the pitch frequency of the speech frame.

4. The method of claim 1 in which said K-dimensional data vector consists of short-term Fourier transform coefficients representing said signal.

5. The method of claim 1 wherein said data vector consists of samples representative of the spectral magnitude of a portion of a signal.

6. The method of claim 1 including the step of identifying the codevector in said codebook from which said optimal subcodevector was extracted.

7. A method for classifying a pattern for use with means for acquiring an input subvector containing features representative of a particular one of J classes, said subvector having from time to time any one of a plurality of different dimensions, with any particular occurrence of said subvector containing L sub-samples of a K-dimensional data vector with L<K, and means for acquiring an ordered set of L index values that identifies which ordered subset of components of said data vector yields the elements of said subvector, and including a method for classification of the input subvector into one of J classes, and having a predetermined codebook containing a plurality of codevectors of fixed dimension K and an associated class index for each codevector, said method for classification of the input subvector comprising the steps of:

receiving a signal and computing said K-dimensional vector representing the signal;

extracting from each of s aid codevectors a subcodevector of dimension L by selecting components of said codevector in accordance with said ordered set of index values;

computing for each said subcodevector in said codebook a measure of distortion between said input subvector and said subcodevector;

comparing the distortion values so computed to fin d the substantially minimum value; and reading out the class index associated with the codevector in said codebook from which said distortion minimizing subcodevector was extracted.

8. The method of claim 7 wherein the codebook contains N codevectors denoted $Y_i$, where the subscript i is an index for each stored codevector, and wherein said codebook is designed by the method of using an arbitrary initial codebook and a set of m pairs of training vectors, where m>N, with each such pair consisting of a selector vector Q that specifies said ordered index set and an associated variable dimension subvector S, said step of using an arbitrary initial codebook comprising the steps of:

clustering said m pairs into N clusters wherein each individual pair is assigned to a particular cluster with label index i if the distortion between each variable dimension subvector S of said individual pair and a subcodevector selected from each codevector $Y_i$ is minimized over all possible assignments of said individual pair to a cluster;

computing N centroid vectors from said N clusters of pairs wherein the centroid vector $C_i$ for that cluster with label index i is chosen to be that vector which substantially minimizes the sum of the distortions between each pair in the cluster and the corresponding codevector $Y_i$;

updating said codebook by replacing N codevectors $Y_i$ by the said centroid vectors $C_i$; and testing for convergence of the updated codebook, and if convergence has not been achieved, repeating the process of clustering, computing centroids, and testing for convergence, until convergence has been achieved.

9. The method of claim 7 wherein said data vector consists of samples representative of the spectral magnitude of a frame of speech, and said ordered set of index values is responsive to the pitch frequency of the speech frame.

* * * * *